United States Patent [19]

Cramm et al.

[11] Patent Number: 4,698,404

[45] Date of Patent: Oct. 6, 1987

[54] WATER-ABSORBENT ACRYLIC ACID POLYMER GELS

[75] Inventors: Jeffrey R. Cramm, Winfield; Kristy M. Bailey, Naperville, both of Ill.

[73] Assignee: Nalco Chemical Company, Naperville, Ill.

[21] Appl. No.: 26,073

[22] Filed: Mar. 16, 1987

[51] Int. Cl.$^4$ .................................................. C08F 2/00
[52] U.S. Cl. ...................................... 526/204; 526/207; 526/216; 526/240; 526/311; 525/343; 525/383
[58] Field of Search ............... 526/204, 207, 216, 240, 526/311; 525/343, 383

[56] References Cited

U.S. PATENT DOCUMENTS

| | | | |
|---|---|---|---|
| 4,326,049 | 4/1982 | Rasmussen | 526/204 |
| 4,332,644 | 6/1982 | Hawanaka et al. | 549/368 |
| 4,340,706 | 7/1982 | Obayashi et al. | 526/207 |

OTHER PUBLICATIONS

Chemical Abstracts, 98:216505q, Water Absorbing Polymer Powder Sumitomo Chemical Co. Ltd., Tokyo, Japan.
Chemical Abstracts, 98:144423m, Polymers with High Water Sbsorption Velocity, Sumitomo Chemical Co. Ltd., Tokyo, Japan.
Chemical Abstracts, 98:108296p, Water-Absorbent Polymers, Sumitomo Chemical Co. Ltd., Tokyo, Japan.
Chemical Abstracts, 96:52912a, Aklali Metal Acrylate Polymer having High Salt Solution-Absorbency, Seitetsu Kagaku Co. Ltd.
Chemical Abstracts, 95:170318p, Hygroscopic Polymer Beads, Kao Soap Co., Tokyo, Japan.
Chemical Abstracts, 95:133815c, Polymer Dydrogel with Good Water-Absorbing Capacity, Sumitomo Chemical Co. Ltd., Tokyo, Japan.
Chemical Abstracts, 98:145710u, Sumitomo Chemical Co. Ltd. Tokyo, Japan.
Chemical Abstracts, 97:7257a, Hydrophilic Copolymers of Acrylic Acid and an Olefin or a Styrene, Goodrich, B. F. Co.
Chemical Abstracts, 96:143554b, Hydrophilic Copolymers, B. F. Goodrich Co.
Chemical Abstracts, 96:123883e, Water-Absorbing Self-Crosslinked Polymers, Kao Soap Co. Ltd., Tokyo, Japan.
Chemical Abstracts, 96:123882d, Water-Absorbing Self-Crosslinked Polymers, Kao Soap Co. Ltd., Tokyo, Japan.
Chemical Abstracts, 96:105198f, Water-Absorbing Polymers, Kao Soap Co., Tokyo, Japan.
Chemical Abstracts, 95:62958p, Water-Absorbent Acrylic Polymers, Seitetsu Kagaku Co., Ltd., Tokyo, Japan.
Chemical Abstracts, 95:8238r, Copolymers of Unsaturated Carboxylic Acids and Esters, B. F. Goodrich Co.
Chemical Abstracts, 95:8020p, Solid Water-Swelling Water Insoluble Polymers, NL Industries Inc.
Chemical Abstracts, 94:85077u, Poly (Acrylic Acid) Alkali Metal Salt Crosslinked Composition, Nippon Shokubai Kagaku Kogyo Co. Ltd., Tokyo, Japan.
Chemical Abstracts, 91:124223y, Polyelectrolyte Hydrogel, Union Carbide Corp.
Chemical Abstracts, 90:127572b, Hydrophilic Random Interpolymer from Quaternary Ammonium Monomers, Johnson & Johnson.
Chemical Abstracts, 90:122705n, Absorbent Acrylic Copolymer, B. F. Goodrich Co.
Chemical Abstracts, 90:24434d, Absorbent Films and Laminates, Dow Chemical Company.
Chemical Abstracts, 89:90654f, Crosslinked Polymers from Alkali Metal Salts of Acrylic Acid having Good Water Absorption, Kao Soap Co., Tokyo, Japan.
Chemical Abstracts, 88:192008v, Flexible Water Absorbent Polymer Compositions Comprising Unsatured Carboxylic Acid Acrylic Ester Containing Alkyl Group 10–30 Carbon Atoms, Additional Monomer Plus Aliphatic Diol, B. F. Goodrich Co.
Chemical Abstracts, 88:191788n, Self-Crosslinked Alkali Acrylate Polymers, Kao Soap Co. Ltd.
Chemical Abstracts, 88:153544x, Insoluble Polyelectrolyte in the Form of a Hydrogel, Union Carvide Corp.
Chemical Abstracts, 88:75281t, Water Absorbent Polymers Comprising Unsaturated Carboxylic Acid, Acrylic Ester Containing Alkyl Group 10–30 Carbon Atoms, and Another Acrylic Ester Containing Alkyl Group 2–8 Carbon Atoms, B. F. Goodrich Co.
Chemical Abstracts, 87:136815y, Water-Swellable Articles, Dow Chemical Co.
Chemical Abstracts, 87:102997u, Strongly Absorbing Polymer, Sumitomo Chemical Co. Ltd., Tokyo, Japan.
Chemical Abstracts, 85:6629p, Absorbent Articles Made from Carboxylic Synthetic Polyelectrolytes having Copolymerized N-Substituted Acrylamide Crosslinker, Dow Chemical Company.
Chemical Abstracts, 13687v, Crosslinked Copolymers for Absorption of Aqueous Fluids, Expecially Human or Animal Fluids, Dow Chemical Co.
Chemical Abstracts, 98:90020g, Synthesis of Poly (Sodium Aluminate) with High Water Absorption Capacities, Inst. Chem. Acad, Sin, Beijing, Rep. of China.
Chemical Abstracts, 95:82751u, Water-Absorbing Resin, Sanyo Chemical Industries, Tokyo, Japan.
Chemical Abstracts, Search No: 1635, Subject: Use of Chain Transfer Agents (Such as Sodium Formate) in the Prepn of Crosslinked Polymer Absorbents, 1975-July 1985, CA102(16)132931p, CA1019260231074x, CA99(16):123145c, CA98(2)4838a, CA98(20:4816s, CA96(24):200277q, CA95(22):187911z, CA93(14):132937r, CA87(2):6449w, CA85(8):47129u, C0(18):97015w, CA80(6):28137a.

Primary Examiner—Joseph L. Schofer
Assistant Examiner—N. Sarofim
Attorney, Agent, or Firm—John G. Premo; Donald G. Epple; Anthony L. Cupoli

[57] ABSTRACT

Improved acrylic acid absorbency resins are made utilizing a chain transfer agent during the polymerization process.

3 Claims, No Drawings

WATER-ABSORBENT ACRYLIC ACID POLYMER GELS

INTRODUCTION

Water absorbent resins are used in the manufacture of such items as menstrual articles, diapers, dish cloths and the like. The also find use in the field of agriculture and horticulture as water retentive materials. Further, they are useful in other various fields such as coagulation of sludges, prevention of condensation, the dehydration of oils, etc.

Typical of resins capable of acting as absorbent resins are the crosslinked polyacrylic acid salt polymers. Outstanding resins of this type, in that they exhibit excellent salt solution absorbency, are the acrylic acid resins described in U.S. Pat. No. 4,340,706 The resins of this patent are particularly useful in producing absorbent products such as sanitary napkins and disposable diapers.

The method of producing these resins is generally described in U.S. Pat. No. 4,340,706 as: "a process for producing an alkali metal acrylate or ammonium acrylate polymer having excellent salt solution absorbency, characterized by suspending an aqueous solution of acrylic acid and an alkali metal acrylate or ammonium acrylate, the mole ratio of the acrylic acid to the alkali metal acrylate or ammonium acrylate being 50/50 to 2/98, in an alicyclic or aliphatic hydrocarbon solvent containing a surfactant having an HLB value of 8–12, subjecting the resulting suspension to inverse suspension polymerization in the presence of a water-soluble radical polymerization initiator and, if necessary, crosslinking the resulting polymer with a crosslinking agent."

The disclosure of U.S. Pat. No. 4,340,706 is incorporated herein by reference and is made a part hereof.

While a variety of crosslinking compounds can be used to practice this patented process, the water-soluble glycidyl ether compounds are particularly preferred. Illustrative of such crosslinking agents are the water-soluble diglycidyl ether compound including, for example, (poly)-ethylene glycol diglycidyl ether, (poly)-propylene glycol diglycidyl ether, (poly)-glycerin diglycidyl ether, and the like.

The present invention is directed to a method of producing absorbent resins of the type produced in U.S. Pat. No. 4,340,706 which have a much higher water-holding and saline absorbency capacity than those produced without using the improvements described herein.

THE INVENTION

An improved process for producing an alkali metal acrylate or ammonium acrylate polymer having excellent salt solution absorbency of the type characterized by suspending an aqueous solution of acrylic acid and an alkali metal acrylate or ammonium acrylate, the mole ratio of the acrylic acid to the alkali metal acrylate or ammonium acrylate being 50/50 to 2/98, in an alicyclic or aliphatic hydrocarbon solvent containing a surfactant having an HLB value of 8–12, subjecting the resulting suspension to inverse suspension polymerization in the presence of a water-soluble radical polymerization initiator and, if necessary, crosslinking the resulting polymer with a crosslinking agent, the improvement which comprises conducting the polymerization in the presence of a water-soluble chain transfer agent.

A variety of chain transfer agents can be used such as, for example, thiols, amines, secondary alcohols such as isopropyl alcohol, bisulfite ion, monobasic sodium phosphate and the thiol acids such as 3-mercaptopropionic acid. The preferred chain transfer agent that gives outstanding results is formic acid which may be used as a free acid or in the form of its alkali metal or ammonium salt.

The amount of chain transfer agent used will usually be at least 0.3% by weight based on monomer (BOM) with a preferred range being about 0.4–1 to 2% by weight BOM.

The method of preparing the polymer as previously indicated is described in U.S. Pat. No. 4,340,706. To illustrate the advantages of the invention, there is set forth below a typical reactant menu.

| Chemical Name | Percent |
|---|---|
| Heptane | 62.56 |
| Sorbitan monostearate Rx 4 moles EO | .55 |
| Acrylic acid | 11.56 |
| 50% sodium hydroxide | 10.02 |
| DI water | 12.12 |
| Sodium formate | .04 |
| Potassium persulfate | .04 |
| DI water | .91 |
| Heptane | 1.62 |
| Sorbitan monolaurate | .55 |
| Ethylene glycol diglycidyl ether | .03 |
| | 100.00% |

A typical reaction using the above ingredients would be as follows:

The monomer solution was prepared by first diluting the sodium hydroxide with D.I. water, then adding the acrylic acid slowly while maintaining the temperature below 40° C. with cooling. The chain transfer agent was dissolved in the monomer solution at 25° C. Ethylene oxide sorbitan monostearate was dissolved in heptane and charged to the reactor. Agitation was started and the monomer solution was added followed immediately by the initiator solution. The resulting unstable suspension was heated to 55° C., then purged with nitrogen. The heat of polymerization causes the mixture to reflux. After 1.5 hours sorbitan monolaurate was added, then water was removed by azeotropic distillation. Finally, the crosslinker was added. After cooling, the polymer was collected by filtration and dried.

A number of examples are set forth below illustrating the advantages of the invention using the general preparative techniques and general reaction conditions described above.

EXAMPLE 1

In these laboratory experiments, crosslinker was added after water removal to maximize the effect of the chain transfer agent. Results for sodium formate are shown in Table 1. With 0.12 mole percent EGDGE[1] as the crosslinker, 50 to 90% increases in capacity were obtained in the range 0.4 to 0.5 mole percent formate (BOM). With 1,4-butanediol diglycidyl ether (BDDGE) as the crosslinker, up to 75% increases in capacity were achieved.

[1] Ethylene glycol diglycidyl ether

Capacity was measured for free swell absorption of 1.6% sodium chloride solution. A 1.00 g sample of polymer was added with stirring to 200 g saline. After stirring for 5 minutes the gel was poured onto a 100 mesh screen and the unabsorbed saline was drained off. The capacity equals the grams of 1.6% saline absorbed per gram of polymer.

Speed was measured for absorption of 1.6% sodium chloride solution. A 1.00 g sample of polymer was weighed in a small aluminum dish. 30 grams of saline was added and the time required for complete absorption of the saline without stirring was measured.

TABLE I

Effect of Formate

| Reaction No. | Reactor | Acid Lot | X-Linker | X-Link Level (mole % BOM) | Formate Level (mole % BOM) | Speed (sec) | Capacity (g/g) |
|---|---|---|---|---|---|---|---|
| 1 | 2 liter | 204 | EGDGE | 0.12 | 0.0 | 8.4 | 47 |
| 2 | 2 liter | 209 | EGDGE | 0.12 | 0.2 | 6.8 | 50 |
| 3 | 2 liter | 204 | EGDGE | 0.12 | 0.3 | 11.0 | 62 |
| 4 | 2 liter | 262 | EGDGE | 0.12 | 0.4 | 15.0 | 70 |
| 5 | 2 liter | 209 | EGDGE | 0.12 | 0.4 | 27.0 | 90 |
| 6 | 2 liter | 209 | EGDGE | 0.12 | 0.4 | 21.0 | 75 |
| 7 | 2 liter | 204 | EGDGE | 0.12 | 0.5 | 14.0 | 72 |
| 8 | 2 liter | 262 | EGDGE | 0.2 B4 0.10 | 0.5 | 11.0 | 64 |
| 9 | 2 liter | 204 | EGDGE | 0.08 | 0.5 | 14.0 | 60 |
| 10 | 2 liter | 204 | EGDGE | 0.00 | 0.5 | 120.0 | Too soluble |
| 11 | 2 liter | 204 | EGDGE | 0.12 | 0.7 | 31.0 | 64 |
| 12 | 2 liter |  | 1,4-BDDGE | 0.10 | 0.0 | 8.0 | 57 |
| 13 | 2 liter | 209 | 1,4-BDDGE | 0.12 | 0.2 | 9.0 | 57 |
| 14 | 2 liter | 204 | 1,4-BDDGE | 0.12 | 0.3 | 18.0 | 80 |
| 15 | 2 liter | 204 | 1,4-BDDGE | 0.10 | 0.5 | 45.0 | 100 |
| 16 | 15 liter | 209 | EGDGE | 0.12 | 0.5 | 38.0 | 65 |
| 17 | 15 liter | 209 | EGDGE | 0.12 | 0.3 | 7.5 | 44 |

EXAMPLE 2

Results for experiments using isopropyl alcohol (IPA) and monobasic sodium phosphate as chain transfer agents are summarized in Table II. Although not as effective as sodium formate, IPA at sufficiently high levels (5.7 mole percent BOM) does lead to ~10% increase in capacity. Using 0.2 mole percent BOM monobasic sodium phosphate, an increase incapacity of ~15% was achieved.

TABLE II

Effect of Chain Transfer Agent

| Reaction No. | Cross Linker | Mole % BOM X-Linker | CTA | Mole % CTA BOM | Speed (sec) | Capacity (ml/g) |
|---|---|---|---|---|---|---|
| 1 | EGDGE | 0.12 | None | 0 | 5.3 | 48 |
| 2 | EGDGE | 0.12 | IPA | 1.1 | 4.5 | 49 |
| 3 | EGDGE | 0.12 | IPA | 5.7 | 16.9 | 53 |
| 4 | EGDGE | 0.12 | IPA | 11.4 | >180 | 24 |
| 5 | BDDGE | 0.1 | None | 0 |  | 62 |
| 6 | BDDGE | 0.1 | NaH2PO4 | 0.2 | 25.2 | 71 |
| 7 | BDDGE | 0.1 | NaH2PO4 | 0.5 | 27.6 | 72 |

EXAMPLE 3

Several absorbent polymers were prepared using 3-mercaptopropionic acid in place of sodium formate (Table III). High levels severely inhibited the polymerization. Low and moderate levels showed up to 17% increased capacity over the blank. The most active range may lie somewhere between 0.04 and 0.4 mole percent.

TABLE III

Effect of 3-Mercaptopropionic Acid

| Reaction No. | Acid Lot | EGDGE Level (mole % BOM) | Merc Level (mole % BOM) | Speed (sec) | Capacity (g/g) |
|---|---|---|---|---|---|
| 1 | 262 | 0.12 | 0.400 | polymerization inhibited | |
| 2 | 262 | 0.12 | 0.800 | polymerization inhibited | |
| 3 | 262 | 0.12 | 0.004 | 14 | 47 |
| 4 | 262 | 0.12 | 0.008 | 17 | 48 |
| 5 | 209 | 0.12 | 0.040 | 8 | 43 |
| 6 | 209 | 0.12 | 0.000 | 11 | 41 |

Having thus described our invention, we claim:

1. An improved process for producing an alkali metal acrylate or ammonium acrylate polymer having excellent salt solution absorbency, characterized by suspending an aqueous solution of acrylic acid and an alkali metal acrylate or ammonium acrylate, the mole ratio of the acrylic acid to the alkali metal acrylate or ammonium acrylate being 50/50 to 2/98, in an alicyclic or aliphatic hydrocarbon solvent containing a surfactant having an HLB value of 8–12, subjecting the resulting suspension to inverse suspension polymerization in the presence of a water-soluble radical polymerization initiator and, if necessary, crosslinking the resulting polymer with a crosslinking agent, the improvement which comprises conducting the polymerization in the presence of a water-soluble chain transfer agent.

2. The process of claim 1 where the water-soluble chain transfer agent is formic acid.

3. The method of claim 2 where a glycidyl ether crosslinking agent is employed.

* * * * *